(12) United States Patent
Mizutani (10) Patent No.: US 8,711,420 B2
(45) Date of Patent: Apr. 29, 2014

(54) DATA PROCESSOR AND SCANNER DEVICE

(75) Inventor: Norio Mizutani, Mie-ken (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 422 days.

(21) Appl. No.: 12/972,607

(22) Filed: Dec. 20, 2010

(65) Prior Publication Data

US 2011/0194156 A1 Aug. 11, 2011

(30) Foreign Application Priority Data

Feb. 10, 2010 (JP) ................................. 2010-027386

(51) Int. Cl.
*G06K 15/00* (2006.01)
*G06F 3/12* (2006.01)

(52) U.S. Cl.
CPC ............ *G06F 3/1203* (2013.01); *G06F 3/1205* (2013.01); *G06F 3/1208* (2013.01); *G06F 3/1257* (2013.01)
USPC ........... 358/1.18; 358/1.1; 358/1.9; 358/1.16; 358/527; 358/538; 358/540

(58) Field of Classification Search
CPC .................................................... G06F 3/1203
USPC ............................................... 358/1.16–1.18
See application file for complete search history.

(56) References Cited

U.S. PATENT DOCUMENTS

| | | | |
|---|---|---|---|
| 6,188,490 B1 * | 2/2001 | Miyake | 358/1.18 |
| 6,856,422 B1 | 2/2005 | Higashibata et al. | |
| 6,891,642 B1 * | 5/2005 | Shigehiro | 358/450 |
| 7,133,149 B2 * | 11/2006 | Keane et al. | 358/1.15 |
| 7,843,582 B2 * | 11/2010 | Burlingame | 358/1.15 |
| 7,911,640 B2 * | 3/2011 | Nishikawa | 358/1.18 |
| 8,175,415 B2 * | 5/2012 | Mizutani | 382/298 |
| 8,279,482 B2 * | 10/2012 | Tomizuka et al. | 358/1.16 |
| 8,346,015 B2 * | 1/2013 | Tanaka et al. | 382/284 |
| 8,368,944 B2 * | 2/2013 | Sakurai et al. | 358/1.18 |
| 2001/0019420 A1 | 9/2001 | Sanbongi et al. | |
| 2002/0019833 A1 | 2/2002 | Hanamoto | |
| 2002/0041386 A1 | 4/2002 | Suzuki et al. | |

(Continued)

FOREIGN PATENT DOCUMENTS

CN 1855988 A 11/2006
CN 1921547 A 2/2007

(Continued)

OTHER PUBLICATIONS

European Patent Office, extended European Search Report for European Patent Application No. 10252156.4 (counterpart European patent application), dated Feb. 6, 2013.

(Continued)

*Primary Examiner* — Richard Zhu
(74) *Attorney, Agent, or Firm* — Merchant & Gould P.C.

(57) ABSTRACT

A data processor includes an image acquiring unit, a reference file acquiring unit, and a file generating unit. The image acquiring unit is configured to acquire a plurality of sets of image data indicating a plurality of images. The reference file acquiring unit is configured to acquire a reference file including a reference object including first information indicating a layout of at least two images among the plurality of images. The file generating unit is configured to generate a file in which the plurality of images are laid out based on the first information.

9 Claims, 8 Drawing Sheets

(56) References Cited

U.S. PATENT DOCUMENTS

| | | | |
|---|---|---|---|
| 2004/0174563 A1* | 9/2004 | Cassidy et al. | 358/1.18 |
| 2005/0091599 A1* | 4/2005 | Yamakado et al. | 715/732 |
| 2005/0134933 A1 | 6/2005 | Tsue et al. | |
| 2006/0221779 A1 | 10/2006 | Matsushita et al. | |
| 2006/0245018 A1* | 11/2006 | Byun | 358/527 |
| 2007/0046996 A1 | 3/2007 | Matsuda | |
| 2007/0052979 A1* | 3/2007 | Burlingame | 358/1.1 |
| 2007/0064278 A1 | 3/2007 | Sugimoto | |
| 2007/0133882 A1 | 6/2007 | Matsuno | |
| 2007/0248373 A1* | 10/2007 | Vekaria | 399/82 |
| 2008/0079997 A1* | 4/2008 | Kawano | 358/1.15 |
| 2008/0151322 A1* | 6/2008 | Morales et al. | 358/448 |
| 2008/0229212 A1 | 9/2008 | Miyazaki | |
| 2008/0266589 A1* | 10/2008 | Sakurai et al. | 358/1.13 |
| 2009/0022424 A1 | 1/2009 | Chen et al. | |
| 2009/0244314 A1* | 10/2009 | Yamamoto | 348/222.1 |

FOREIGN PATENT DOCUMENTS

| | | |
|---|---|---|
| CN | 101546588 A | 9/2009 |
| EP | 1045572 A2 | 10/2000 |
| EP | 1610542 A1 | 12/2005 |
| JP | H10-293856 A | 11/1998 |
| JP | 2000-134458 A | 5/2000 |
| JP | 2000-355142 A | 12/2000 |
| JP | 2002-049907 A | 2/2002 |
| JP | 2002-171369 A | 6/2002 |
| JP | 2002-218368 A | 8/2002 |
| JP | 2005-346208 A | 12/2005 |
| JP | 2007-164770 A | 6/2007 |
| JP | 2008-065670 A | 3/2008 |

OTHER PUBLICATIONS

Japan Patent Office, Office Action for Japanese Patent Application No. 2010-027386 (counterpart to above-captioned patent application), mailed Jan. 24, 2012.

The State Intellectual Property Office of the Peoples Republic of China, Notification of First Office Action in counterpart Patent Application No. CN 201110034277.2 (issuing Jan. 22, 2013).

State Intellectual Property Office of the People's Republic of China, Notification of the Second Office Action for Chinese Patent Application No. 201110034277.2 (counterpart to above-captioned patent application), mailed Aug. 20, 2013.

\* cited by examiner

DATA PROCESSOR AND SCANNER DEVICE

CROSS REFERENCE TO RELATED APPLICATION

This application claims priority from Japanese Patent Application No. 2010-027386 filed Feb. 10, 2010. The entire content of the priority application is incorporated herein by reference.

TECHNICAL FIELD

The invention disclosed in this specification relates to a data processor that generates image files.

BACKGROUND

One conventional data processor known in the art converts a scanned image to a file in a user-specified format (a JPEG file, a BMP file, a PDF file, or a TIFF file, for example) and outputs the resulting file. When scanning N images, where N is a positive integer greater than "0", this data processor can generate either N image files (i.e., one image file for each scanned image) or a single file having data for the N scanned images arranged in N pages.

SUMMARY

However, there is further need for such a data processor to generate a file having a plurality of images arranged according to a user-desired layout (hereinafter, this type of file will be called a "special file"), but the technology described above is not capable of generating such special files. Therefore, it is an object of the invention to provide a technology that facilitates a user in acquiring these special files.

In order to attain the above and other objects, the invention provides a data processor. The data processor includes an image acquiring unit, a reference file acquiring unit, and a file generating unit. The image acquiring unit is configured to acquire a plurality of sets of image data indicating a plurality of images. The reference file acquiring unit is configured to acquire a reference file including a reference object including first information indicating a layout of at least two images among the plurality of images. The file generating unit is configured to generate a file in which the plurality of images are laid out based on the first information.

According to another aspect, the invention provides a scanner device. The scanner device includes a scanning unit, an image acquiring unit, a reference file acquiring unit, and a file generating unit. The scanning unit is configured to scan a plurality of images and generates a plurality of sets of image data indicating the plurality of images. The image acquiring unit is configured to acquire the plurality of sets of image data. The reference file acquiring unit is configured to acquire a reference file including a reference object including first information indicating a layout of at least two images among the plurality of images. The file generating unit is configured to generate a file in which the plurality of images are laid out based on the first information.

BRIEF DESCRIPTION OF THE DRAWINGS

The particular features and advantages of the invention as well as other objects will become apparent from the following description taken in connection with the accompanying drawings, in which.

DETAILED DESCRIPTION

First Embodiment

Structure of a Network System

Figure 1:
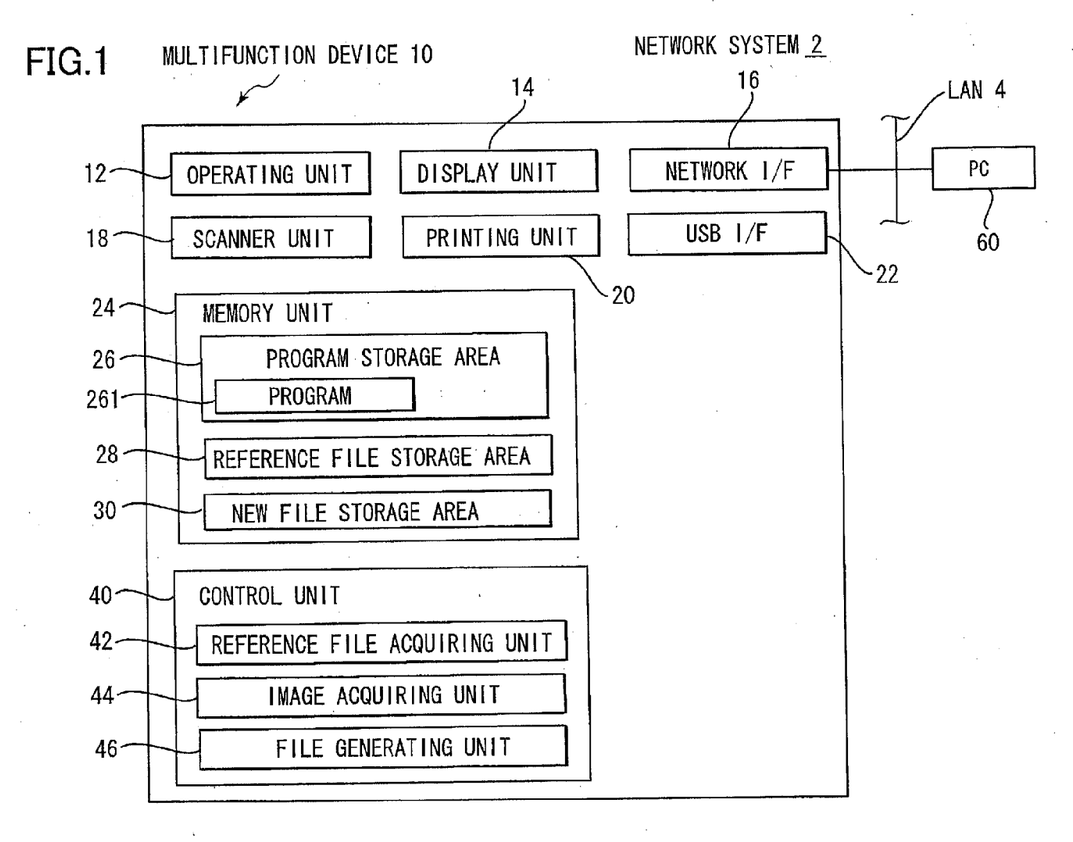
FIG. 1 is a block diagram showing a general structure of a network system according to a first embodiment.

Next, a first embodiment of the invention will be described while referring to accompanying drawings. FIG. 1 is a block diagram showing a general structure of a network system 2 according to the embodiment. The network system 2 includes a local area network (LAN) 4, a multifunction device 10, and a personal computer (PC) 60. The multifunction device 10 and the PC 60 are connected to the LAN 4 and are capable of communicating with each other via the LAN 4.

Structure of the Multifunction Device 10

The multifunction device 10 has a plurality of functions, such as a copier function, printer function, scanner function, e-mail transmission/reception function, and Internet facsimile function. As shown in FIG. 1, the multifunction device 10 includes an operating unit 12, a display unit 14, a network interface 16, a scanner unit 18, a printing unit 20, a USB interface 22, a memory unit 24, and a control unit 40.

The operating unit 12 has a plurality of keys. A user operates the keys in the operating unit 12 to input a variety of instructions into the multifunction device 10. The display unit 14 functions to display various types of information. The network interface 16 functions to connect the multifunction device 10 to the LAN 4. The scanner unit 18 has a contact image sensor (CIS) or a charge-coupled device (CCD) scanning mechanism, for example, and functions to generate image data by scanning a target image. The printing unit 20 has an inkjet head or a laser printing mechanism, for example, and functions to print images according to instructions received from the control unit 40. The USB interface 22 enables connection of a USB memory device or a USB cable, for example.

The memory unit 24 has a program storage area 26, a reference file storage area 28, and a new file storage area 30. The program storage area 26 stores programs 261. The control unit 40 executes various processes according to the programs 261 stored in the memory unit 24 in order to implement the functions of a reference file acquiring unit 42, an image acquiring unit 44, and a file generating unit 46 described later. The reference file storage area 28 is for storing reference files 100, 300, 500, 700, and 900 described later with reference to FIGS. 4, 6, 8, 10, and 12. The new file storage area 30 is for storing new files 200, 400, 600, 800, and 1000 described later with reference to FIGS. 5, 7, 9, 11, and 13 generated based on the reference files stored in the reference file storage area 28.

The reference files stored in the reference file storage area 28 are created in advance by the user through operations on the PC 60. These reference files are then stored in the reference file storage area 28 through user operations. New files are generated when the multifunction device 10 executes a new file generation process described below with reference to FIGS. 2 and 3 and are stored in the new file storage area 30.

New File Generation Process

Next, the new file generation process executed by the control unit 40 of the multifunction device 10 will be described with reference to FIGS. 2 and 3. The control unit 40 executes the new file generation process when the power to the multifunction device 10 is turned on.

Figure 2:
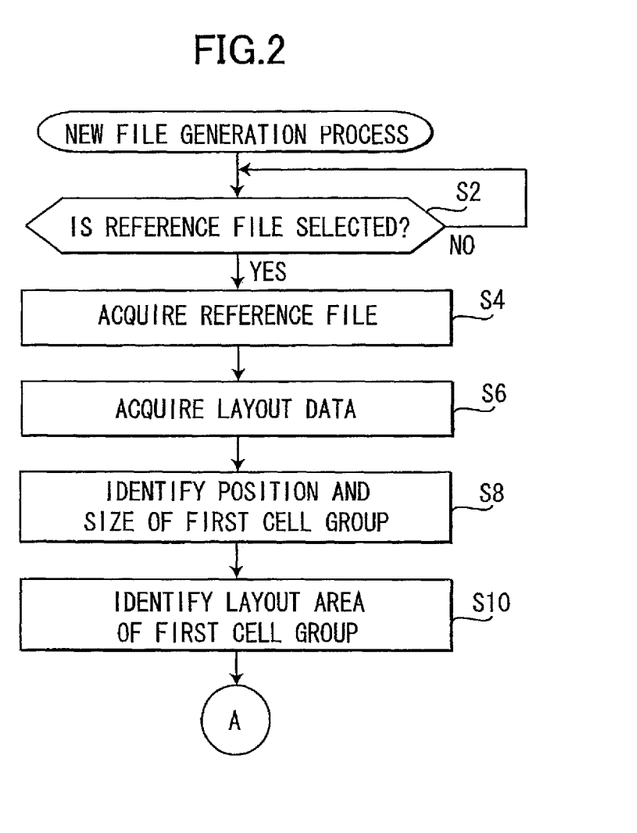
FIG. 2 is a flowchart illustrating a part of a new file generation process according to the first embodiment.

In S2 of FIG. 2, the control unit 40 begins monitoring user input to determine whether the user has performed an operation to select a reference file (the reference file 100 in FIG. 4, for example) from the reference file storage area 28. The user can perform this selecting operation by operating the operating unit 12 of the multifunction device 10 or an operating unit of the PC 60 (not shown). The control unit 40 reaches a YES determination in S2 when the user selects a reference file. The following description will be based on a case in which the user has selected the reference file 100 of FIG. 4 in S2. In S4 the reference file acquiring unit 42 (see FIG. 1) reads and acquires the reference file 100 selected in S2 from the reference file storage area 28.

Figure 4:
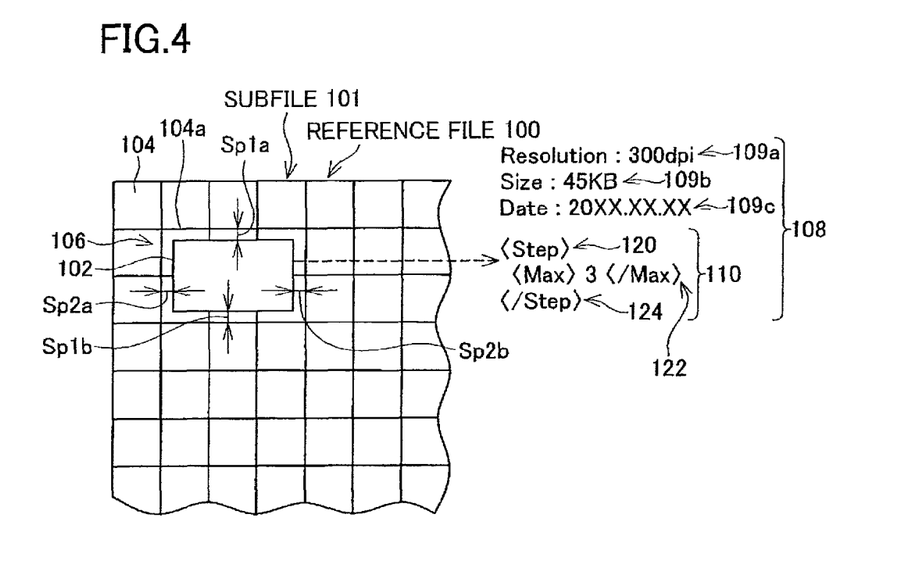
FIG. 4 is an explanatory diagram illustrating a reference file of a first example.

As shown in FIG. 4, the reference file 100 in the embodiment includes one or more subfiles 101. The subfile 101 represents a sheet extending horizontal and vertical direction. The subfile 101 (the sheet) has a plurality of cells 104 arranged in a grid with vertical columns and horizontal rows. An example of the reference file 100 having this structure is a file produced with the Microsoft Excel (registered trademark) program. A single reference image 102 is arranged in each subfile 101. In this example, the reference image 102 has a rectangular shape, with its horizontal sides longer than its vertical sides. The reference image 102 is arranged in a cell group 106 configured of six cells. Hereafter, the cell group 106 in which the reference image 102 is arranged will be referred to as the "first cell group." The reference image 102 occupies only the center region of the first cell group 106. In other words, a margin is formed between the outline of the reference image 102 and the outline of the first cell group 106. The margin includes spaces Sp1a and Sp1b extending horizontally, and spaces Sp2a and Sp2b extending vertically.

The reference image 102 also includes attribute data 108. The attribute data 108 is data that the user inputs in advance. The user generates a reference file 100 by specifying an image including the attribute data 108 as the reference image 102 and arranging the reference image 102 in the desired first cell group 106.

In the embodiment, the attribute data 108 includes data elements 109a, 109b, and 109c, and layout data 110. The data element 109a indicates the resolution of the reference image 102. The data element 109b indicates the data size of the reference image 102. The data element 109c indicates the date on which the reference image 102 was generated. Here, the types of data elements 109a-109c are merely examples, and the attribute data 108 may include data other than these types. Further, the attribute data 108 need not include all of the data elements 109a-109c, but should include at least one of the data elements 109a-109c in addition to the layout data 110. The attribute data 108 may alternatively be called "metadata."

The layout data 110 includes data elements 120, 122, and 124. The data elements 120, 122, and 124 relate to the layout for a plurality of images that is used in the new file generation process to generate a new file 200 (see FIG. 5) based on the reference file 100. The content of the layout data 110 will be described later in greater detail.

In S6 the reference file acquiring unit 42 acquires the layout data 110 included in the reference file 100 that was acquired in S4. In S8 the reference file acquiring unit 42 identifies the position and the size of a region of the first cell group 106 (herein after "the size of the region of the cell group is referred to as simply "the size of the cell group") in the reference file 100 acquired in S4 in which the reference image 102 is arranged. The reference file acquiring unit 42 identifies the position of the first cell group 106 by identifying the position of an upper leftmost cell 104a constituting the first cell group 106. Using the example of FIG. 4, the reference file acquiring unit 42 identifies the cell positioned second from the top and second from the left as the position of the upper leftmost cell 104a. The reference file acquiring unit 42 identifies the size of the first cell group 106 by identifying the number of cells constituting the first cell group 106 in the horizontal direction (three cells in the example of FIG. 4) and the number of cells constituting the first cell group 106 in the vertical direction (two cells in the example of FIG. 4).

Figure 5:
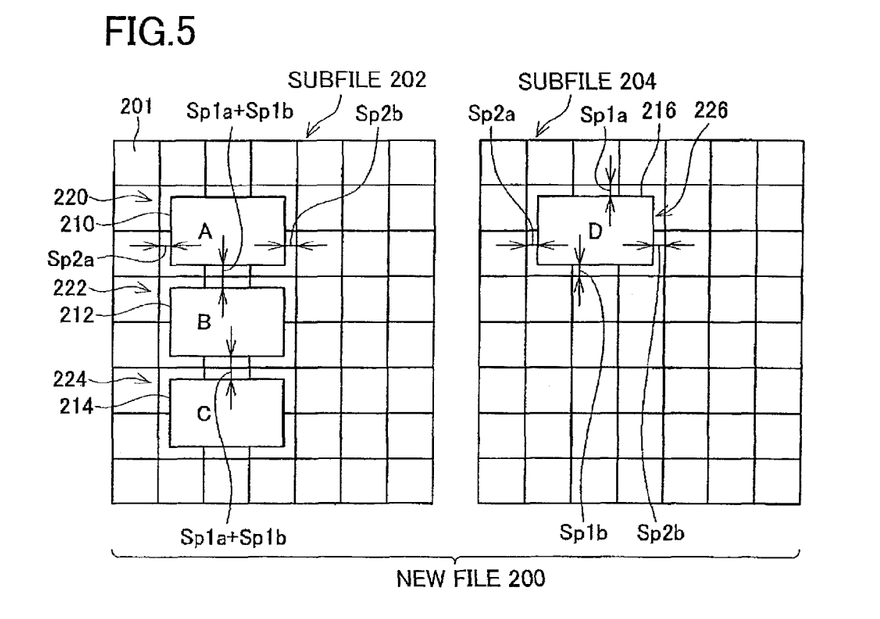
FIG. 5 is an explanatory diagram illustrating a new file generated based on the reference file shown in FIG. 4.

As will be described later, the position of the first cell group 106 identified in S8 will also be the position of a cell group 220 serving as the location in the new file 200 for arranging a single image 210. Hereafter, the cell group 220 of the new file 200 in which the image 210 is arranged will be referred to as a "second cell group." Further, the size of the first cell group 106 identified in S8 will also be the size of the second cell groups (the second cell group 220, etc.) in the new file 200.

In S10 the reference file acquiring unit 42 identifies the layout area of the first cell group 106 identified in S8 in which the reference image 102 is arranged. More specifically, in S10 the reference file acquiring unit 42 identifies the spaces Sp1a, Sp1b, Sp2a, and Sp2b between each side constituting the outline of the first cell group 106 and the corresponding side constituting the outline of the reference image 102. Identifying the size of the first cell group 106 in S8 and identifying the spaces Sp1a, Sp1b, Sp2a, and Sp2b in S10 is equivalent to identifying the layout size of the reference image 102 (the horizontal and vertical dimensions of the reference image 102). As will be described later, the layout area of the reference image 102 identified in S10 will also serve as the layout area for arranging each image in the new file 200. After the reference file acquiring unit 42 completes the process in S10, the process advances to S30 of FIG. 3.

Figure 3:
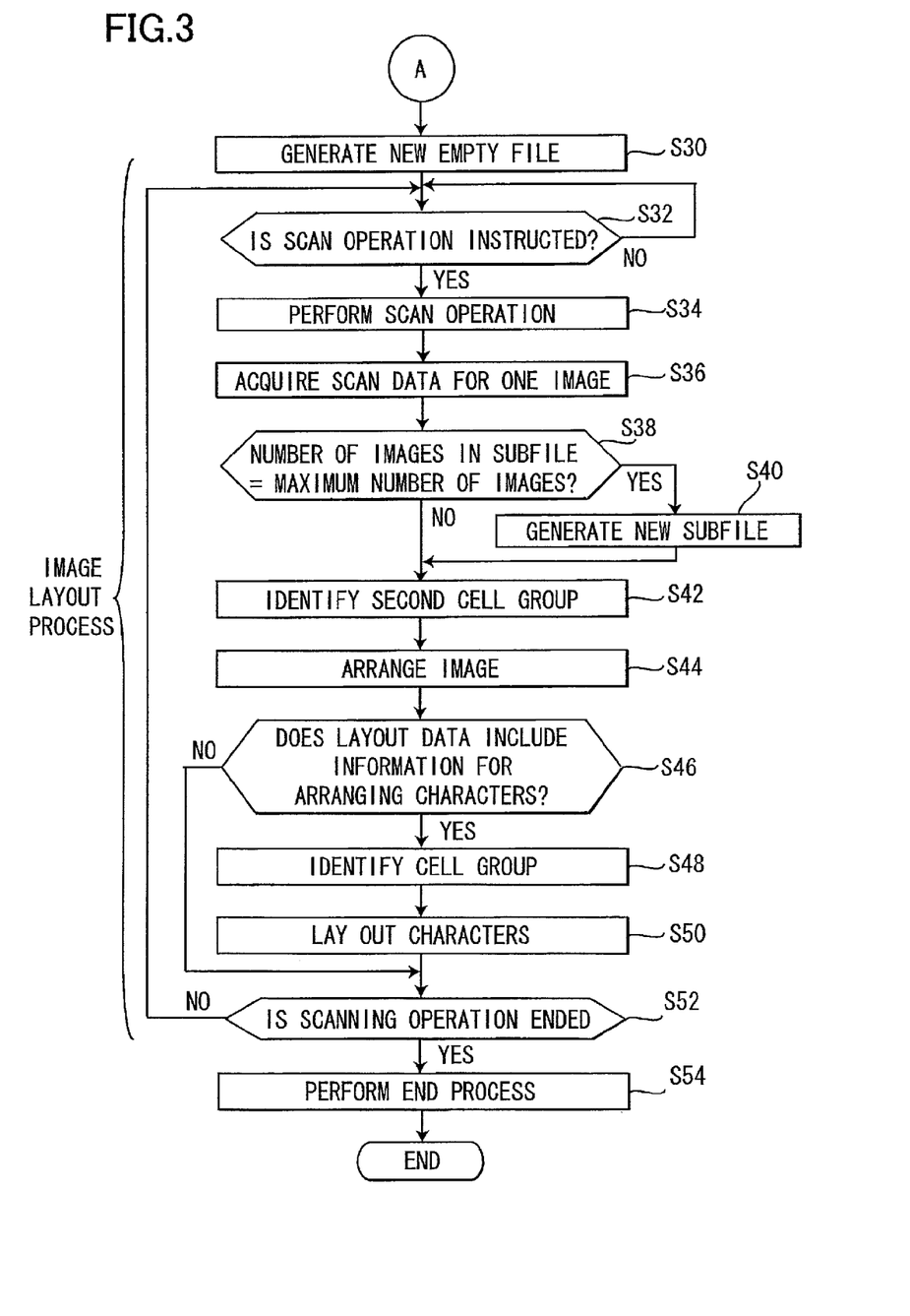
FIG. 3 is a flowchart illustrating a remaining part of the new file generating process shown in FIG. 2.

In S30 of FIG. 3, the control unit 40 generates an empty file as a base for creating a new file. The empty file is a newly generated file that includes no images, text, or other data. In the embodiment, the empty file generated in S30 includes one subfile having a sheet and a plurality of cells. After generating the empty file in S30, the control unit 40 executes an image layout process in S32-S52. Specifically, in S32 the control unit 40 monitors user input for a scan instruction. The user can input a scan instruction into the multifunction device 10 by operating the operating unit 12 of the multifunction device 10 after setting one scan target (one sheet of an original, for example) in an automatic document feeder (ADF; not shown), for example. Upon detecting a scan instruction (S32: YES), the control unit 40 advances to S34.

In S34 the image acquiring unit 44 (see FIG. 1) controls the scanner unit 18 to scan the scan target. As a result of the scanning operation performed by the scanner unit 18, in S36 the image acquiring unit 44 acquires scan data for one image (hereinafter, scan data for an image will simply be called an "image").

In S38 the file generating unit 46 (see FIG. 1) determines whether the number of images in the subfile that is currently the process target has reached the maximum number of images that can be arranged in a single subfile (a single sheet). While this will be described in greater detail later, the layout data 110 acquired in S6 of FIG. 2 includes the data element 122 indicating the maximum number of images that can be arranged in a single subfile (the single sheet). The file generating unit 46 compares the maximum number indicated by the data element 122 to the number of images currently arranged in the target subfile and reaches a YES determination in S38 when the two numbers are equal. Here, the "target subfile" denotes a subfile that was generated in S30 during the period after a subfile was generated in S30 and until a new subfile is generated in S40. After a new subfile is generated in S40, the target subfile denotes this new subfile.

When the number of scanned images in the target subfile equals the maximum number (S38: YES), in S40 the file generating unit 46 generates a new subfile to be included in the file generated in S30. After the file generating unit 46 completes the process in S40 or reaches a No determination in S38, the process advances to S42.

In S42 the file generating unit 46 identifies the second cell group for laying out the image acquired in S36 in the sheet of the target subfile. The process in S42 will be described later in greater detail. In S44 the file generating unit 46 arranges the image acquired in S36 in the second cell group identified in S42. The process in S44 will also be described later in greater detail. Subsequently, the process advances to S46.

In S46 the file generating unit 46 determines whether the layout data 110 acquired in S6 of FIG. 2 includes information for arranging characters and the like (hereinafter referred to as "layout information"). The layout information will be described later in greater detail. If the layout data 110 includes layout information (S46: YES), in S48 the file generating unit 46 identifies the cell group in which the characters and the like are to be laid out. In S50 the file generating unit 46 lays out the characters and the like in the cell group identified in S48. After the file generating unit 46 completes the process in S50 or reaches a NO determination in S46, the process advances to S52.

In S52 the file generating unit 46 determines whether the user has performed an operation to end the image layout process. The user can perform this operation on the operating unit 12 of the multifunction device 10. If the file generating unit 46 determines that an operation to end the image layout process was performed (S52: YES), then the image layout process is ended and the file generating unit 46 advances to S54.

However, if such an operation was not performed (S52: NO), the file generating unit 46 returns to S32 and monitors user input for a new scan instruction. Here, the user may replace the scan target (original) set in the ADF for the previous image layout process with a new scan target and subsequently input a scan instruction in the multifunction device 10. In this case, the control unit 40 again reaches a YES determination in S32, and repeats the process in S32-S52 for laying out a new image in the subfile.

In S54 the file generating unit 46 executes a process to end creation of a new file. Specifically, in S54 the file generating unit 46 stores the new file having one or more images laid out through one or more image layout processes in the new file storage area 30 (see FIG. 1). After completing the process to end new file creation in S54, the current process ends.

The user can access the new file storage area 30 in the multifunction device 10 through operations on an operating unit of the PC 60, for example. In this case, the control unit 40 supplies the new file stored in the new file storage area 30 in S54 to the PC 60 (i.e., the user of the PC 60), thereby allowing the user to access the new file.

Examples of Reference Files and New Files

Next, examples of reference files stored in the reference file storage area 28 (see FIG. 1) and new files generated when the control unit 40 executes the new file generation process based on these reference files will be described with reference to FIGS. 4 through 13.

EXAMPLE 1

As mentioned earlier, the layout data 110 included in the reference file 100 shown in FIG. 4 has the data elements 120, 122, and 124. The combination of "<Step>" specified by the data element 120 and "</Step>" specified by the data element 124 signifies that a plurality of images are to be arranged vertically. That is, the data elements 120 and 124 define a step command instructing to lay out images vertically. Hereinafter, the data elements 120 and 124 will also be called "step." Further, "<Max>3</Max>" specified by the data element 122 signifies that the maximum number of images to be arranged in one subfile is "3". Because in the example 1 the data element 122 ("<Max>3</Max>") is located between the data elements 122 and 124, the number of images specified by the data element 122 are to be arranged vertically in one subfile. The maximum number is used in S38 of FIG. 4. Hence, the data elements 120, 122, and 124 in this example indicate that a maximum number of three images are to be arranged vertically in one subfile.

FIG. 5 shows an example of the new file 200 created based on the reference file 100 in FIG. 4. The method of generating the new file 200 according to the process in FIGS. 2 and 3 will be described next. In the process for creating an empty file described in S30 of FIG. 3, the control unit 40 first creates a subfile 202 without any of the images 210, 212, or 214 shown in FIG. 5. The subfile 202 has a plurality of cells 201 arranged in a grid with vertical columns and horizontal rows. Thus, when the process arrives at S38 the first time, the number of images arranged in the subfile 202 is "0". Accordingly, the file generating unit 46 reaches a NO determination in S38 since the maximum number indicated by the data element 122 in the layout data 110 is "3". Upon reaching S42 for the first time, the file generating unit 46 identifies the position of the first cell group 106 identified in S8 of FIG. 2 (the position of the upper leftmost cell 104a constituting the first cell group 106) as the location of the second cell group 220 for laying out an image. Also in S42, the file generating unit 46 identifies the size of the first cell group 106 identified in S8 of FIG. 2 (three cells horizontally by two cells vertically) as the size of the second cell group 220 for laying out an image. Upon arriving at S44 for the first time, the file generating unit 46 lays out the image 210 acquired in the first execution of S36 in the second cell group 220. At this time, the file generating unit 46 arranges the image 210 so that the space between each side constituting the outline of the second cell group 220 and each corresponding side constituting the outline of the image 210 matches the spaces Sp1a, Sp1b, Sp2a, and Sp2b identified in S10 of FIG. 2. Consequently, the layout size of the image 210 is identical to the layout size of the reference image 102.

The file generating unit 46 also reaches a NO determination in the second execution of S38. Since the file generating unit 46 knows that a plurality of images are to be laid out vertically (i.e., stepped) based on the data elements 120 and 124 in the layout data 110 acquired in S6 of FIG. 2, in the second execution of S42 the file generating unit 46 identifies a new second cell group 222 abutting the lower edge constituting the contour of the second cell group 220 identified in the first execution of S42. The horizontal position of the new second cell group 222 is identical to that of the second cell group 220. Further, the size of the new second cell group 222 is the same as the size of the second cell group 220. In S44 for the second time, similarly to S44 for the first time, the file generating unit 46 lays out the image 212 acquired in the second execution of S36 in the second cell group 222 so that the space between each side constituting the outline of the second cell group 222 and each corresponding side constituting the outline of the image 212 matches the spaces Sp1a, Sp1b, Sp2a, and Sp2b.

Similarly, in the third execution of S42 the file generating unit 46 identifies a new second cell group 224 abutting the lower edge constituting the contour of the second cell group 222 identified in the second execution of S42. The horizontal position of the new second cell group 224 is identical to that of the second cell group 220. In S44 for the third time, the file generating unit 46 lays out the image 214 acquired in the third execution of S36 in the second cell group 224.

Upon reaching S38 for the fourth time, the file generating unit 46 reaches a YES determination since the number of images now laid out in the subfile 202 is "3" and the maximum number indicated by the data element 122 in the layout data 110 is also "3". Accordingly, in S40 the file generating unit 46 generates a new subfile 204. In this case, in S42, the file generating unit 46 identifies the position and the size of the first cell group 106 identified in S8 of FIG. 2 as the location of the second cell group 226 for laying out an image in the subfile 204. In S44, according to the same method described above, the file generating unit 46 lays out the image 216 acquired in the fourth execution of S36 in the second cell group 226. Accordingly, the new file 200 including the subfiles 202 and 204 is completely created.

As described above, a plurality of images 210, 212, 214, and 216 are respectively arranged in a plurality of second cell groups 220, 222, 224, and 226 within the new file 200. The layout size of each image in the new file 200 is equivalent to the layout size of the reference image 102. Further, the space formed between adjacent images in the new file 200 (such as images 210 and 212) is corresponding to the spaces Sp1a and Sp1b, and specifically the sum of these spaces. In this example, the layout data 110 of FIG. 4 does not include the above layout information for arranging characters and thus the file generating unit 46 reaches a NO determination in S46 of FIG. 3.

EXAMPLE 2

Figure 6:
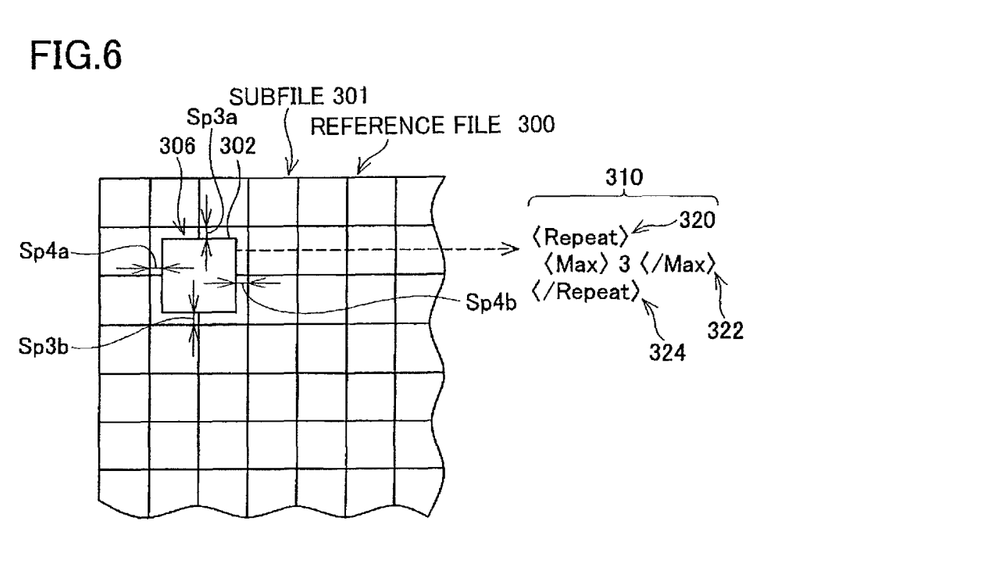
FIG. 6 is an explanatory diagram illustrating a reference file of a second example.
Figure 7:
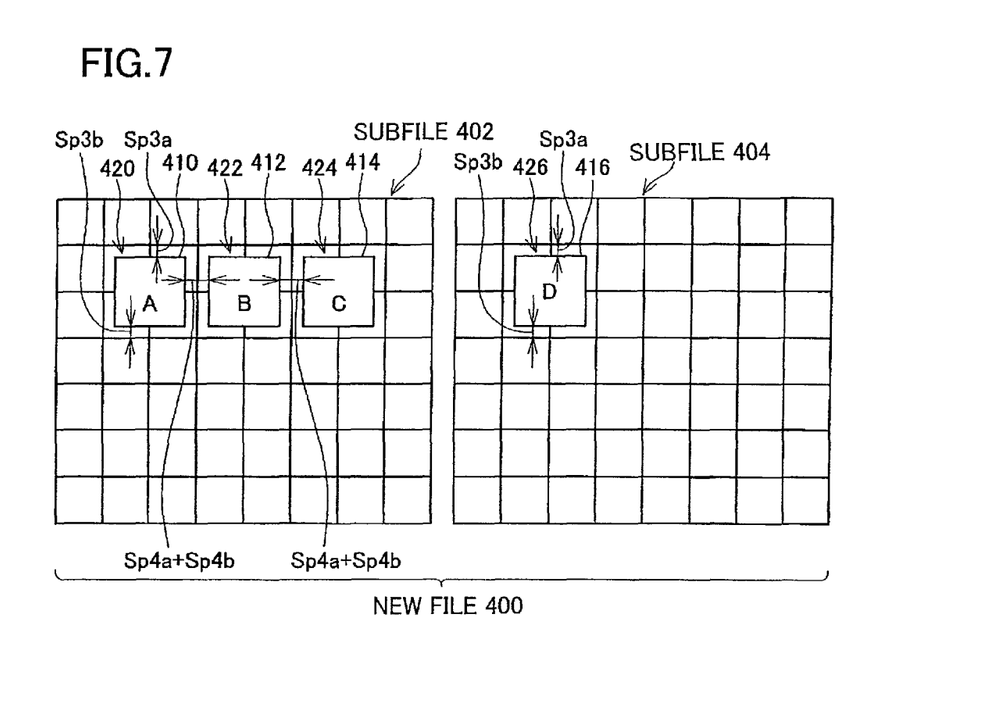
FIG. 7 is an explanatory diagram illustrating a new file generated based on the reference file shown in FIG. 6.

Next, a second example of a reference file and a new file will be described with reference to FIGS. 6 and 7. The following description will focus primarily on the differences from example 1 and may omit descriptions of the similarities. A reference file 300 of the second example has a subfile 301. One reference image 302 is arranged in the subfile 301 (the sheet). In this example, the reference image 302 has a square shape. The reference image 302 is arranged in a first cell group 306 configured of four cells. Spaces Sp3a, Sp3b, Sp4a, and Sp4b are formed respectively between each edge constituting the outline of the first cell group 306 and the corresponding edge constituting the outline of the reference image 302. As with the reference image 102 in FIG. 4, the reference image 302 also includes attribute data. The attribute data itself is not shown in FIG. 6, but layout data 310 included in the attribute data is shown in the drawing. Attribute data has also been omitted from FIGS. 8 and 10 in subsequent examples. In this example, the layout data 310 includes data elements 320, 322, and 324 that differ from the content of the layout data 110 in example 1. Of the content in the layout data 310, the combination of "<Repeat>" specified by the data element 320 and "</Repeat>" specified by the data element 324 signifies that a plurality of images are to be arranged horizontally. That is, the data elements 320 and 324 define a repeat command instructing to lay out images horizontally. Hereinafter, the data elements 320 and 324 will be called "Repeat."

In S30 of FIG. 3, the control unit 40 creates a new subfile 402. Similarly to the first example, in S42 for the first time, the file generating unit 46 identifies the location and the size of the second cell group 420. In S44 for the first time, the file generating unit 46 lays out the image 410 acquired in the first execution of S36 in the second cell group 420. Based on the layout data 310 acquired in S6 of FIG. 2, the file generating unit 46 can learn that a plurality of images are to be arranged horizontally (i.e., repeated). Hence, when executing S42 for the second time, the file generating unit 46 identifies a new second cell group 422 that abuts the right edge constituting the outline of the second cell group 420 that is identified in the first time S42. The vertical position of the new second cell group 422 is identical to the vertical position of the second cell group 420. In S44 for the third time, the file generating unit 46 lays out the image 412 acquired in the second execution of S36 in the second cell group 422. Similarly, in S44 for the third time, the file generating unit 46 lays out the image 414 acquired in the third execution of S36 in the second cell group 424. In S44 for the fourth time, the file generating unit 46 lays out the image 416 acquired in the fourth execution of S36 in a second cell group 426 in a new subfile 404. Accordingly, the new file 400 including the subfiles 402 and 404 completely created.

As described above, a plurality of images 410, 412, 414, and 416 are respectively arranged in a plurality of second cell groups 420, 422, 424, and 426 within the new file 400. The layout size of each image in the new file 400 is equivalent to the layout size of the reference image 302. Further, the space formed between adjacent images in the new file 400 (such as images 410 and 412) is corresponding to the spaces Sp4a and Sp4b, and specifically the sum of these spaces.

EXAMPLE 3

Figure 8:
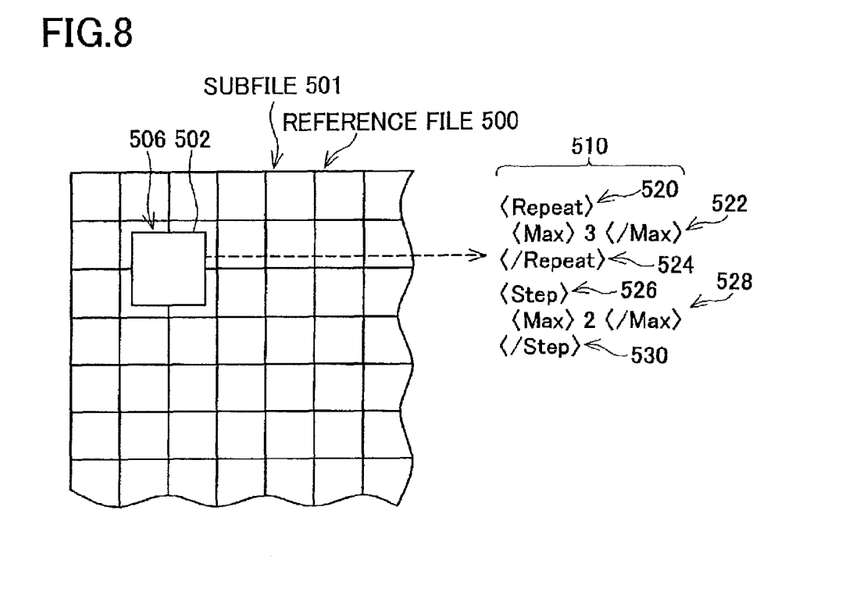
FIG. 8 is an explanatory diagram illustrating a reference file of a third example.
Figure 9:
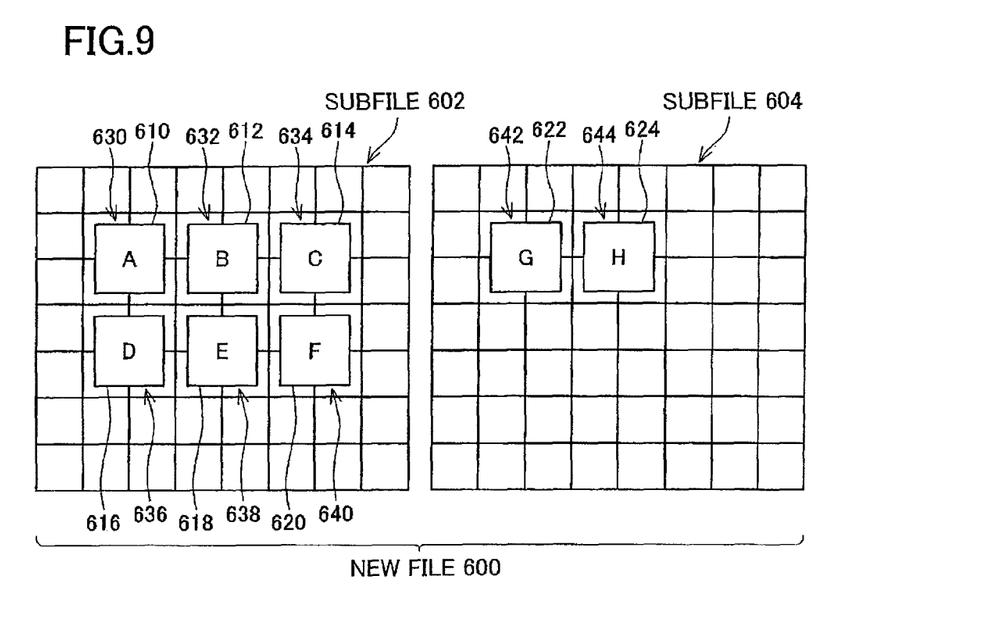
FIG. 9 is an explanatory diagram illustrating a new file generated based on the reference file shown in FIG. 8.

Next, a third example of a reference file and new file will be described with reference to FIGS. 8 and 9. The following description will focus primarily on the differences from the first and second examples and may omit descriptions of the similarities. In the third example, a reference file 500 has a subfile 501. The subfile 501 includes a first cell group 506. One reference image 502 is laid out in the first cell group 506. The reference image 502 includes layout data 510. The layout data 510 has data elements 520, 522, 524, 526, 528, and 530. The data elements 520 and 524 constitute a repeat command, while the data elements 526 and 530 constitute a step command. The data element 522 specifies the maximum number of images that can be repeated (arranged horizontally) in one subfile, and the data element 528 specifies the maximum number of images that can be stepped (arranged vertically) in one subfile. Hence, the combination of the data elements 522 and 528 in this example signify the maximum number of images (3×2=6) that can be arranged in one subfile.

In the layout data 510, the repeat command specified by data elements 520 and 524 are described before the step command specified by data elements 526 and 530. Thus, in this case the file generating unit 46 lays out images in the layout process by first repeating the image layout horizontally before stepping vertically. In other words, the file generating unit 46 lays out three images 610, 612, and 614 acquired in the first to third executions of S36 in three second cell groups 630, 632, and 634 arranged horizontally in a subfile 602. Subsequently, the file generating unit 46 executes a step. In other words, the file generating unit 46 lays out an image 616 acquired in the fourth execution of S36 in a second cell group 636 positioned beneath the second cell group 630. The file generating unit 46 lays out respectively two images 618 and 620 acquired in fifth and sixth executions of S36 in second cell groups 638 and 640 right side of the second cell group 636. The file generating unit 46 generates a new subfile 604 and similarly lays out respectively two images 622 and 624 acquired in seventh and eighth executions of S36 in second cell groups 642 and 644. In other words, in the third example, the file generating unit 46 executes the following routine:

First, the file generating unit 46 repeatedly executes, one of a repeat and step commands that is described in first in the layout data (hereinafter, referred to as a preceding command) such that the maximum number of images are arranged in a direction specified by the preceding command. Here, this maximum number is a number described in the layout data for the preceding command.

Second, the file generating unit 46 executes, once, remaining one of the repeat and step commands that is described subsequently to the preceding command in the layout data (hereinafter, referred to as the subsequent command).

This routine is repeated until the maximum number of images arranged in a direction specified by the subsequent command. Here, this maximum number is a number described in the layout data for the subsequent command. Accordingly, the new file 600 is completely created.

EXAMPLE 4

Next, a fourth example of a reference file and new file will be described with reference to FIGS. 10 and 11. The following description will focus primarily on the differences from the previous examples and may omit descriptions of the similarities. In the fourth example, a reference file 700 has a subfile 701. A first cell group 706 is included in the subfile 701. A single reference image 702 is laid out in the first cell group 706. The reference image 702 includes layout data 710. The layout data 710 includes data elements 720, 722, 724, 726, 728, 730, and 732. The data elements 720 and 732 constitute a step command. The data element 722 indicates the unit of the step that indicates a width of a region used for one step. In this example, "<Unit>-1,0,2,0</Unit>" indicated by the data element 722 signifies that the step is executed based on a unit ranging from coordinates (−1, 0) to coordinates (2, 0), with a second cell group 820 identified in the first execution of S42 in FIG. 3 treated as coordinates (0, 0). Here, the coordinates signified by the data element 722 indicates a position of cell groups. The first and second numbers ("1" and "0") in the data element 722 indicate a left end coordinate, and the third and fourth numbers ("2" and "0") indicate a right end coordinate. So, the data element 722 indicates a region defined by the left end coordinate and the right end coordinate is used as a unit for one step command.

Data element 724 indicates the maximum number of images that may be stepped in one subfile. While the data elements 720 and 732 define a step command in this example, the data elements 720 and 732 may define a repeat command. In this case, a repeat would be executed based on a range indicated by data element 722.

The layout data 710 also includes the data elements 726, 728, and 730. In the data element 726, "SetNo" in the "<SetNo>−1,0,1</SetNo>" indicates that a serial number is to be laid out. The portion of "−1, 0, 1", i.e. "−1,0" of the data element 726 (that is, the first and second numbers in the data element 726) denotes the cell group represented by coordinates (−1, 0), while the "1" part of "−1,0,1" (that is the third number in the data element 726) indicates that the serial number is to increase by increments of "1". The coordinates (−1, 0) indicate a cell group 822 on the left side of the second cell group 820. "<SetFileName>1,0</SetFileName>" indicated by the data element 728 means that the image name is to be laid out in the cell group represented by coordinates (1, 0). Coordinates (1, 0) indicate a cell group 824 on the right side of the second cell group 820. "<SetOCRResult>2,0</SetOCRResult>" indicated by the data element 730 denotes that text obtained after performing an optical character recognition (OCR) process on the image (hereinafter, such text will be called the "OCR results") are to be laid out in the cell group represented by coordinates (2, 0). Coordinates (2, 0) indicate a cell group 826 to the right of the cell group 824 represented by coordinates (1, 0).

The horizontal dimension of each of the cell groups 822, 824, and 826 described above is predetermined based on the content of the commands (the data elements 726, 728, and 730). For example, the data element 726 (SetNo), which is a command for laying out a serial number, specifies the cell group 822 represented by coordinates (−1, 0). Here, the horizontal dimension of the cell group 822 specified by the command for laying out a serial number has been predetermined to be a width equivalent to two cells in the this example. The vertical dimension of the cell group 822 is the same as the vertical dimension of the second cell group 820 (equivalent to four cells) for laying out an image 810. Similarly, the horizontal dimension of the cell group 824 for laying out the image name has been predetermined to be a width equivalent to two cells in the present example, and the horizontal dimension of the cell group 826 for laying out the OCR results has been predetermined to be a width equivalent to four cells in this example. In addition, the vertical dimensions of cell groups 824 and 826 are the same as the vertical dimension of the second cell group 820 (equivalent to four cells).

The control unit 40 creates a new subfile 802 in the empty file generation process of S30 described in FIG. 3. Similarly to the first example, in S42 for the first time, the file generating unit 46 identifies the location and size of the second cell group 820, and in S44 lays out the image 810 acquired in the first execution of S36 in the second cell group 820. In this example, the file generating unit 46 subsequently reaches a YES determination in S46 since the layout data 710 acquired in S6 includes the data elements 726, 728, and 730. In the first execution of S48, the file generating unit 46 identifies the cell groups 822, 824, and 826 for laying out characters and the like based on the layout data 710 acquired in S6. More specifically, at this time the file generating unit 46 identifies the cell group 822 (coordinates (−1, 0)) adjacent to the left side of the second cell group 820, the cell group 824 (coordinates (1, 0)) adjacent to the right side of the second cell group 820, and the cell group 826 (coordinates (2, 0)) adjacent to the right side of the cell group 824. As described above, at this time the file generating unit 46 identifies the horizontal dimensions of the cell groups 822 and 824 to be two cells worth, and the horizontal dimension of the cell group 826 to be four cells worth. The file generating unit 46 also identifies the vertical dimension of cell groups 822, 824, and 826 to match the second cell group 820, i.e., to be four cells worth. Upon executing the process in S50 the first time, the file generating unit 46 lays out a serial number 822*a*, an image name 824*a*, and OCR results 826*a* (that is, character information) in the cell groups 822, 824, and 826, respectively. When S50 is executed the first time, the serial number 822*a* is "1" and the image name 824*a* is "xxxxx01". Further, in S50 the file generating unit 46 acquires the OCR results 826*a* by executing an OCR process on the image 810. The serial number 822*a* is arranged in one cell positioned in the upper-leftmost corner of the cell group 822. Similarly, the image name 824*a* and the OCR results 826*a* are laid out in the upper leftmost cells of the respective cell groups 824 and 826. However, when all the characters in the image name 824*a* and the OCR results 826*a* cannot fit in this single cell, the character display continues into adjacent cells.

In S42 for the second time, the file generating unit 46 identifies the position below as the location of the second cell group 830, and in S44 lays out the image 812 acquired in the second execution of S36 in the second cell group 830. Similarly to the first execution, in the second execution of S48 the file generating unit 46 identifies the cell groups 832, 834, and 836 and in S50 lays out a serial number 832*a*, an image name 834*a*, and OCR results 836*a* in the cell groups 832, 834, and 836, respectively. Here, in the second execution of S50, the serial number 822*a* is "2" (i.e. the serial number "1" is incremented by one) and the image name 824*a* is "xxxxx02". Similarly, in the third execution, in S44 the file generating unit 46 lays out the image 814 acquired in the third execution of S36 in the second cell group 840 and in S50 lays out a serial number 842*a*, an image name 844*a*, and OCR results 846*a* in the cell groups 842, 844, and 846, respectively. Accordingly, the new file 800 is completely created.

EXAMPLE 5

Figure 12:
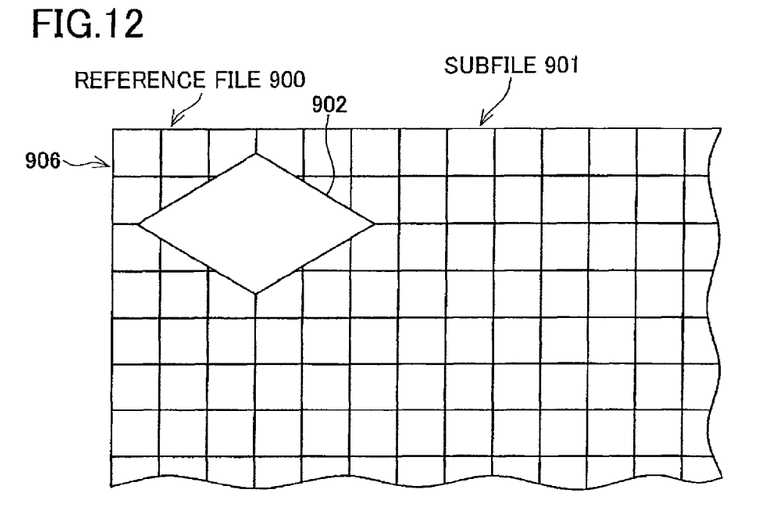
FIG. 12 is an explanatory diagram illustrating a reference file of a fifth example.
Figure 13:
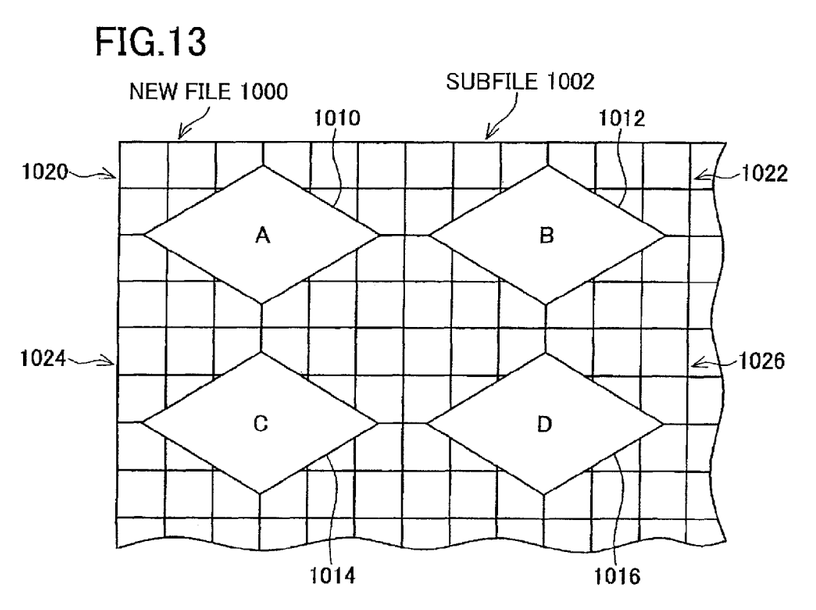
FIG. 13 is an explanatory diagram illustrating a new file generated based on the reference file shown in FIG. 12.

Next, a fifth example of the reference file and new file will be described with reference to FIGS. 12 and 13. The following description will focus primarily on the differences from the previous examples and may omit descriptions of the similarities. In the fifth example, a reference file 900 has a subfile 901. A first cell group 906 is included in the subfile 901. One reference object 902 is arranged in the first cell group 906. In this example, the reference object 902 has a rhomboid shape, however the reference object 902 may have any non-rectangular form, such as a parallelogram, rhombus, circle, or ellipse. Further, the first cell group 906 is configured of twenty-four cells (four vertically by six horizontally). The reference object 902 includes layout data (not shown) similar to the previous examples. In this example, the layout data includes information on using an image to fill the reference object 902.

The file generating unit 46 executes repeat commands according to the layout data (not shown). That is, in the first and second executions of S44, the file generating unit 46 lays out two diagrams having the same shape of the reference object 902 (rhomboid shape, in this example) in the second cell groups 1020, 1022, respectively. The file generating unit 46 selects images 1010 and 1012 acquired in the first and second executions of S36 as data to fill the two rhomboid shaped diagrams located in S44. The file generating unit 46 fills the two rhomboid shaped diagram with the images 1010 and 1012, respectively. Subsequently, the file generating unit 46 executes a step command according to the layout data (not shown). That is, the file generating unit 46 lays out a diagram having the same shape of the reference object 902 (rhomboid shape) in the second cell group 1024 located below the second cell group 1020. Here, an image 1014 that is acquired in the third execution of S36 is selected as data to fills the rhomboid shaped diagram and then this image 1014 fills the rhomboid shaped diagram. Further, the file generating unit 46 lays out a diagram having the same shape of the reference object 902 (rhomboid shape) in the second cell group 1026 located right side of the second cell group 1024. Here, an image 1016 that is acquired in the fourth execution of S36 is selected as data to fills the rhomboid shaped diagram and then this image 1016 fills the rhomboid shaped diagram. Accordingly, the new file 1000 is completely created.

While the embodiment described above offers one method of generating files, a conceivable technique may be employed using the following template to generate a new file in which a plurality of images are arranged in a user-specified layout. That is, the user creates a template by arranging a plurality of reference images in a desired layout. By using this template, the multifunction device 10 can arrange at the positions of the reference images in the template a plurality of images obtained through scanning. Here, the number of images in the templates needs to be the same as the number of images in the new file. In other words, the reference file can be used if any number of images are to be arranged in a new file. Hence, the multifunction device 10 can generate a new file with a plurality of scanned images arranged according to the user's desired layout. However, a technique employing the template described above may be quite labor-intensive for the user since the user must create a template having the same number of reference images as the number of images to be laid out in the new file.

In one of the examples described in the embodiment, the multifunction device 10 generates the new file 200 having images 210 and the like arranged according to the layout data 110 in the reference file 100, as illustrated in FIGS. 4 and 5. The user need only lay out a single reference image 102 in the reference file 100 and add the layout data 110 to the attribute data 108 of the reference image 102 in order to complete the reference file 100. This reduces the user's workload since the user need not lay out the same number of reference images as the number of images to be arranged in the new file. Hence, through the configuration of the embodiment, the user can easily obtain a new file 200 having a plurality of images 210 and the like arranged according to a desired layout.

In the embodiment described above, if the user wishes to arrange a plurality of images 210 and the like vertically, as shown in FIG. 5, the user can add layout data 110 indicating a step command (see FIG. 4) to the attribute data. If the user wishes to arrange images 410 and the like horizontally, as shown in FIG. 7, the user can add layout data 310 indicating a repeat command (see FIG. 6) to the attribute data. In this way, the multifunction device 10 can generate a new file having a plurality of images aligned in the user's desired direction. Further, when generating the reference file, the user need not arrange vertically and horizontally the same number of reference images as the number of images to be laid out in the new file, thereby reducing the user's workload.

In the embodiment described above, the multifunction device 10 generates the new file 200 having images (210 and the like) arranged in second cell groups (220 and the like) having the same size as the first cell group 106, as illustrated in FIGS. 4 and 5. In the embodiment, the user can arrange a reference image 102 in a first cell group 106 having a desired size when creating the reference file 100, whereby the multifunction device 10 can generate a new file 200 that reflects the user's wishes (i.e., the size of one second cell group).

In the embodiment described above, the multifunction device 10 generates the new file 200 so that a specific space (Sp1a+Sp1b) is formed between the two adjacent images 210 and 212, as illustrated in FIGS. 4 and 5. The user can lay out the reference image 102 in the first cell group 106 so as to form desired spaces (the spaces Sp1a and Sp1b described above) when creating the reference file 100, whereby the multifunction device 10 can produce a new file 200 that reflects the user's intention (i.e., amount of space). Since the user need not create a template having space formed between two reference images, the user's workload is reduced.

In the embodiment described above, as illustrated in FIGS. 4 and 5, the size of the reference image 102 in the first cell group 106 is the same as the size of the images 210-216 in the second cell groups 220-226 of the new file 200. The user can arrange a reference image 102 in a first cell group 106 having a desired size when creating the reference file 100, whereby the multifunction device 10 can generate a new file 200 that reflects the user's wishes (i.e., the size of the images 210-216). Thus, the user can easily picture the size of the images 210 and the like that will be laid out in the new file 200.

As shown in FIGS. 4 and 5, a position in the first cell group in the reference file 100 is the same as a position in a second cell group 220 in a file 200. The user can arrange a reference image 102 in a first cell group 106 that is positioned a desired position, whereby the multifunction device 10 can generate a new file 200 that reflects the user's wishes (i.e., a position of the second cell group 220 in which an image 210 will be arranged). Thus, the user can easily picture the position of the images 210 that will be laid out in the new file 200.

Figure 10:
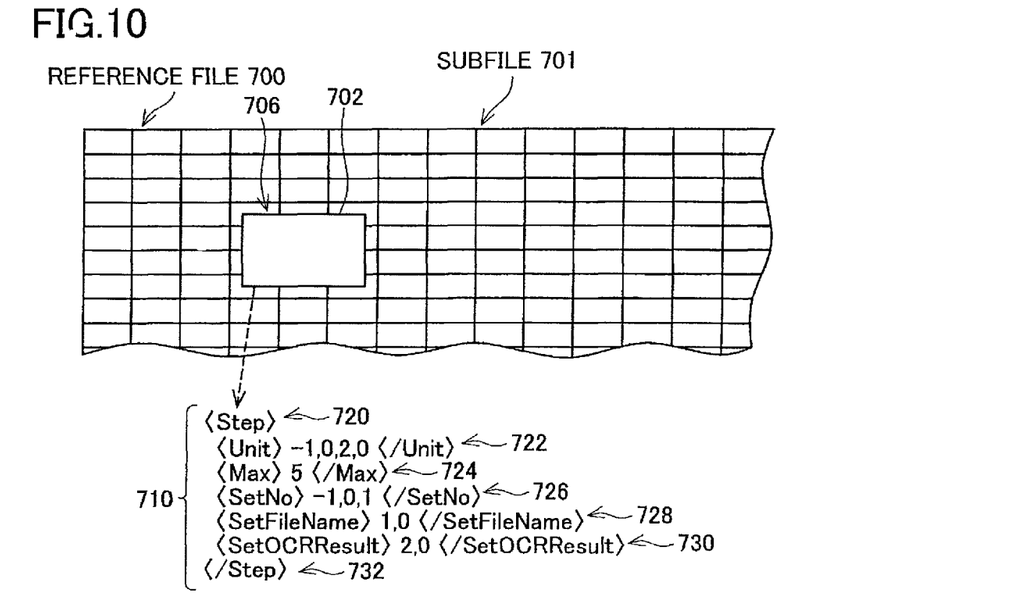
FIG. 10 is an explanatory diagram illustrating a reference file of a fourth example.
Figure 11:
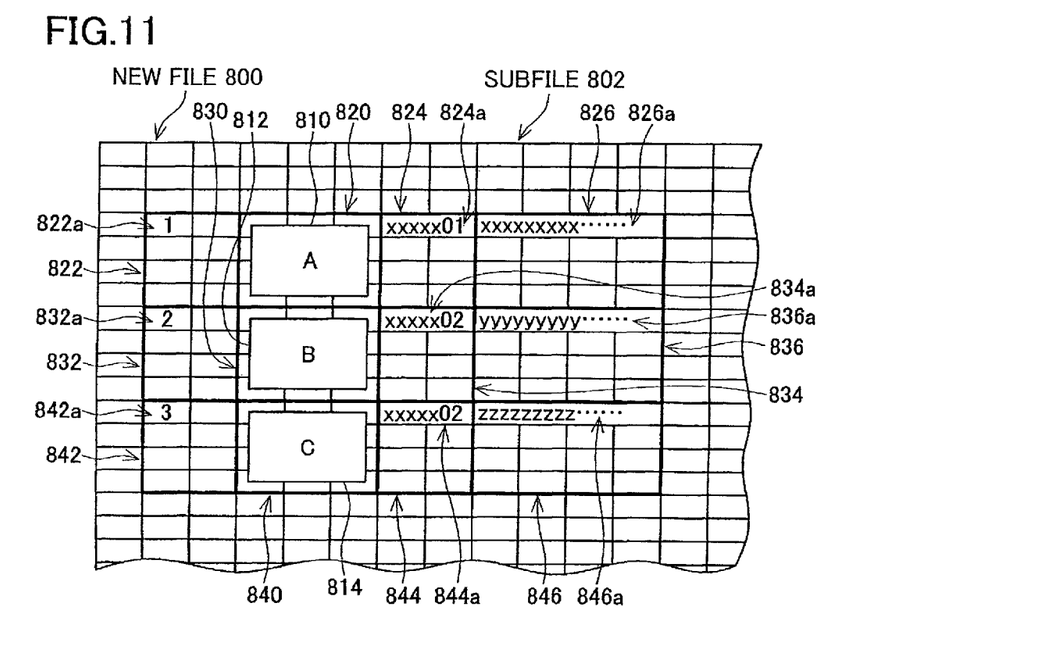
FIG. 11 is an explanatory diagram illustrating a new file generated based on the reference file shown in FIG. 10.

In the embodiment, as shown in FIGS. 10 and 11, a reference file 700 includes data elements 726-730 used for locating information 822a-826a in the cell groups 822-826 adjacent to the second cell group 820. The multifunction device 10 lays out information 822a-826a in the cell group 822-826 according to the data elements 726-730. When the user wishes to locate information 822a-826a, the data elements 726-730 can be included in the reference file 700 as attribute data. Thus, the multifunction device 10 can generate a new file 800 that reflects the user's wishes to locate information 822a-826a.

In the embodiment described above, if the user wishes to limit the maximum number of images (210 and the like) that are arranged in one subfile (202, for example), the user can include the data element 122 in the layout data 110 specifying a maximum number, as illustrated in FIGS. 4 and 5. In this case, the multifunction device 10 can generate one or more subfiles (202, 204, and the like) based on the maximum number of images that the user desires.

In the embodiment described above, the outline of the reference image matches the outline of each image in the new file. For example, if the reference image 102 has a rectangular outline, as in FIG. 4, then the outline of images 210 and the like arranged in the new file 200 is also rectangular. If the outline of the reference object 902 is rhomboid, as in FIG. 12, then the outline of images 1010 and the like arranged in the new file 1000 are also rhomboid. Thus, when creating a reference file 100, 900, or the like, the user can lay out a reference image 102, 902, or the like having the desired outline. Thus, the multifunction device 10 can generate new files 200 and 1000, or the like, that reflect the user's wishes (i.e., the outline of images).

Second Embodiment

Next, a second embodiment of the invention will be described. The following description will focus on the differences from the first embodiment described above. In the first embodiment, the reference file 100 and the new file 200 shown in FIGS. 4 and 5 respectively include the subfiles 101 and 202. The subfiles 101 and 202 have a plurality of cells 104 and 201, respectively. In the second embodiment, the reference file and new file include pages rather than subfiles. Each page defines horizontal and vertical lengths that are used, for example, in the printing operation. The pages do not have cells. One example of this type of reference file and new file is a file created with Microsoft Word (registered trademark).

When a reference file includes the layout data 110 shown in FIG. 4, for example, the data element 122 denotes the maximum number of images that can be arranged on one page in the embodiment. Thus, in place of S8 and S10 in FIG. 2, the file generating unit 46 of the second embodiment identifies the layout position and the layout size of the reference file. In S30 of FIG. 3, the file generating unit 46 generates an empty file including one page. In S38 the file generating unit 46 determines whether the number of images already included in the target page matches the maximum number specified by the data element 122. In S40 the file generating unit 46 generates a new page. In S42 the file generating unit 46 lays out the image on the target page.

Third Embodiment

Next, a third embodiment of the invention will be described. The following description will focus on the differences from the first embodiment described above. In the third embodiment, the data element 122 shown in FIG. 4 denotes the maximum number of images that can be laid out within one file. Hence, in S40 of FIG. 3, the file generating unit 46 generates a new file rather than a new subfile. When executing S44 after a new file was generated in S40, the file generating unit 46 lays out an image in a subfile included in this new file. In other words, unlike the multifunction device 10 described in the first and second embodiments, the multifunction device 10 according to the third embodiment can generate two or more new files. Moreover, each new file in the third embodiment includes only one subfile.

While the invention has been described in detail with reference to the embodiments thereof, it would be apparent to those skilled in the art that various changes and modifications may be made therein without departing from the spirit of the invention.

(1) In the first embodiment, all of the following conditions (a)-(c) are satisfied: (a) the layout sizes of images 210-216 is the same as the layout size of the reference image 102. (b) the positions of images 210-216 with in the second cell groups 220-226 is the same as the position of the reference image 102 within the first cell group 106. (c) the position of the second cell group 220 is the same as the position of the first cell group 106. However, if at least one condition among the conditions (a)-(c) is satisfied, it may not necessary to satisfy all of the conditions (a)-(c).

(2) In the second embodiment, if the size of the reference image 102 is considerably large, it may not be possible to lay out images on the target page of a number equivalent to the maximum number specified by the data element 122 in FIG. 4. For example, even though the data element 122 may specify a maximum number of "3", it may only be possible to fit two images on the target page. In this case, the file generating unit 46 may be configured to generate a new page after two images have been arranged on the target page, even though a NO determination was reached in S38 of FIG. 3.

(3) In the example 4 of the embodiment, the horizontal dimensions of cell groups 822, 824, and 826 in the new file 800 may be set to a width equivalent to one cell, regardless of the commands to lay out character information or the like, rather than a width equivalent to a plurality of cells that is predetermined for each command to lay out character information or the like. The user may set the width of one cell to a desired value by specifying in advance the widths of cells represented by coordinates (−1, 0), (1, 0), and (2, 0) in the reference file 700. That is, in this case, each cell groups 822, 824, and 826 has only one cell in the horizontal direction having the set width.

(4) In the embodiments described above, the reference image 102 is laid out in the reference file 100, as shown in FIG. 4. However, the object laid out in the reference file 100 may be something other than an image, such as text or a graphic. That is, a "reference object" arranged in the reference file 100 may be a graphic that includes no image, for example, and is not limited to an image.

(5) In the embodiments described above, the first cell group 106 and the second cell group 220 each include a plurality of cells, as shown in FIGS. 4 and 5. However, the first and/or second cell groups may be configured of a single cell. Further, the first and/or second cell groups may be configured of a single cell formed by joining a plurality of cells.

(6) In S30 of FIG. 3, the control unit 40 may generate a copy file with the same capacity as the reference file instead of an empty file. In this case, the first image laid out in the copy file should replace the reference file contained therein. Alternatively, rather than generating a new file in S30 of FIG. 3, the control unit 40 may use a new file that was created previously and is already stored in the new file storage area 30. In this case, the control unit 40 may lay out the newly acquired image according to the layout data so as to follow the images already laid out in the previously created new file.

(7) In the embodiment, the multifunction device 10 is one example of the data processor and the scanner device. However, the data processor may be a device that does not include a scanner function, such as, a personal computer. The scanner device may be a device that does not include a printer function, such as, a scanner.

What is claimed is:

1. A data processor comprising:
a control unit configured to execute instructions instructing the control unit to provide functional units including:
an image acquiring unit that is configured to acquire a plurality of sets of image data indicating a plurality of images;
a reference file acquiring unit that is configured to acquire a reference file including a single reference object including first information indicating a layout of at least two images among the plurality of images; and
a file generating unit that is configured to generate a file including at least one subfile in which at least one image of the plurality of images is laid out based on the first information included in the single reference object,
wherein, when the file generating unit generates the file, the file generating unit is configured to determine a positional relation between any adjacent two of the plurality of images using the first information included in the single reference object,
wherein a format of the file is the same as a format of the reference file,
wherein the first information includes first maximum number information indicating a first maximum number, the first maximum number being a maximum number of images that can be arranged in the subfile,
wherein the reference file includes a first plurality of cells arranged in a grid with vertical columns and horizontal rows, wherein a part of the first plurality of cells is classified into a first cell group, the first cell group defining a first region in which the reference object is arranged,
wherein the file generating unit generates the subfile of the file including a second plurality of cells arranged in a grid with vertical columns and horizontal rows, a part of the second plurality of cells in the subfile being classified into a plurality of second cell groups, each of the plurality of second cell groups defining a second region whose size is equivalent to a size of the first region, each of the plurality of images being laid out in one of the plurality of second cell groups,
wherein the reference file includes a reference space between an outline of the first region and an outline of the reference object in a prescribed direction,
wherein, when the file generating unit generates the subfile of the file, the file generating unit repeatedly arranges one image of the plurality of images adjacent to a previously arranged image such that a second cell group for the one image abuts a second cell group for the previously arranged image and such that a space between an outline of the one image and an outline of a second region of the second cell groups for the one image in the prescribed direction matches the reference space, the file generating unit arranging the one image and the previously arranged image in the prescribed direction,
wherein, when a number of the plurality of images acquired by the image acquiring unit is less than or equal to the first maximum number, the file generating unit generates the file including only one subfile in which all of the plurality of images are laid out, and
wherein, when a number of the plurality of images which is acquired by the image acquiring unit is greater than the first maximum number, the file generating unit generates the file including a first subfile in which the first maximum number of images among the plurality of images are laid out and a second subfile in which at least one image among the plurality of images that is excluded from the first maximum number of images laid out in the first subfile is laid out.

2. The data processor according to claim 1,
wherein the first information includes at least one of vertical layout information indicating a layout of the at least two images in a vertical direction and horizontal layout information indicating a layout of the at least two images in a horizontal direction,
wherein when the first information includes the vertical layout information, the file generating unit generates the file such that the plurality of images are laid out in the vertical direction in the file,
whereas when the first information includes the horizontal layout information, the file generating unit generates the file such that the plurality of images are laid out in the horizontal direction in the file.

3. The data processor according to claim 1, wherein the file generating unit identifies a size of the reference object, and generates the file such that each size of the plurality of images is equal to the size of the reference object.

4. The data processor according to claim 1, wherein the file generating unit identifies a position of the first cell group in the reference file and generates the file such that a position of one of the plurality of second cell groups corresponds to the position of the first cell group in the reference file.

5. The data processor according to claim 1,
wherein the first information includes second information indicating a layout of specific information, and
wherein the file generating unit generates the file such that the specific information is laid out adjacent to each of the plurality of second cell groups based on the second information.

6. The data processor according to claim 1,
wherein the reference object has a first shape,
wherein the file generating unit generates the file that includes a plurality of objects having a second shape corresponding to the first shape, each of the plurality of objects being filled by one of the plurality of images.

7. A scanner device comprising:
a scanning unit that is configured to scan a plurality of images and generate a plurality of sets of image data indicating the plurality of images;
an image acquiring unit that is configured to acquire the plurality of sets of image data;
a reference file acquiring unit that is configured to acquire a reference file including a single reference object including first information indicating a layout of at least two images among the plurality of images; and
a file generating unit that is configured to generate a file including at least one subfile in which at least one of the plurality of images is laid out based on the first information included in the single reference object,
wherein, when the file generating unit generates the file, the file generating unit is configured to determine a positional relation between any adjacent two of the plurality of images using the first information included in the single reference object,
wherein a format of the file is the same as a format of the reference file,
wherein the first information includes first maximum number information indicating a first maximum number, the first maximum number being a maximum number of images that can be arranged in the subfile,
wherein the reference file includes a first plurality of cells arranged in a grid with vertical columns and horizontal rows, wherein a part of the first plurality of cells is classified into a first cell group, the first cell group defining a first region in which the reference object is arranged,
wherein the file generating unit generates the subfile of the file including a second plurality of cells arranged in a grid with vertical columns and horizontal rows, a part of the second plurality of cells in the subfile being classified into a plurality of second cell groups, each of the plurality of second cell groups defining a second region whose size is equivalent to a size of the first region, each of the plurality of images being laid out in one of the plurality of second cell groups,
wherein the reference file includes a reference space between an outline of the first region and an outline of the reference object in a prescribed direction,
wherein, when the file generating unit generates the subfile of the file, the file generating unit repeatedly arranges one image of the plurality of images adjacent to a previously arranged image such that a second cell group for the one image abuts a second cell group for the previously arranged image and such that a space between an outline of the one image and an outline of a second region of the second cell groups for the one image in the prescribed direction matches the reference space, the file generating unit arranging the one image and the previously arranged image in the prescribed direction,
wherein, when a number of the plurality of images acquired by the image acquiring unit is less than or equal to the first maximum number, the file generating unit generates the file including only one subfile in which all of the plurality of images are laid out, and
wherein, when a number of the plurality of images which is acquired by the image acquiring unit is greater than the first maximum number, the file generating unit generates the file including a first subfile in which the first maximum number of images among the plurality of images are laid out and a second subfile in which at least one image among the plurality of images that is excluded from the first maximum number of images laid out in the first subfile is laid out.

8. The data processor according to claim 1, wherein the file generating unit is configured to generate the file such that a position of the reference object relative to a prescribed position in the reference file is the same as a position of one of the plurality of images relative to a prescribed position in the file and such that a size of the reference object in the reference file is the same as a size of the one of the plurality of images in the file.

9. The data processor according to claim 1, wherein the file generating unit includes:
a first identifying unit configured to identify a first layout area of the reference object in the reference file;
an acquiring unit configured to acquire the first information included in the reference file, the first information including a layout direction in which the plurality of images are to be arranged;
a generating unit configured to generate a new file as the file whose format is the same as the format of the reference file;
a layout unit configured to lay out a first image from among the plurality of images in the new file based on the identified first layout area; and
a second identifying unit configured to identify a second layout area in which to lay out a second image from among the plurality of images in the new file based on the identified first layout area and the layout direction, such that the first image and the second image are laid out in the layout direction, after laying out the first image in the new file,
wherein the layout unit is configured to lay out the second image from among the plurality of images in the new file based on the identified second layout area and the layout direction, such that the first image and the second image are laid out in the layout direction.

* * * * *